April 10, 1928.　　　　　　　　　　　　　　　　　　　　　1,665,816
C. MAUTNER
FRAME JOINT CONSTRUCTION
Filed July 19, 1927
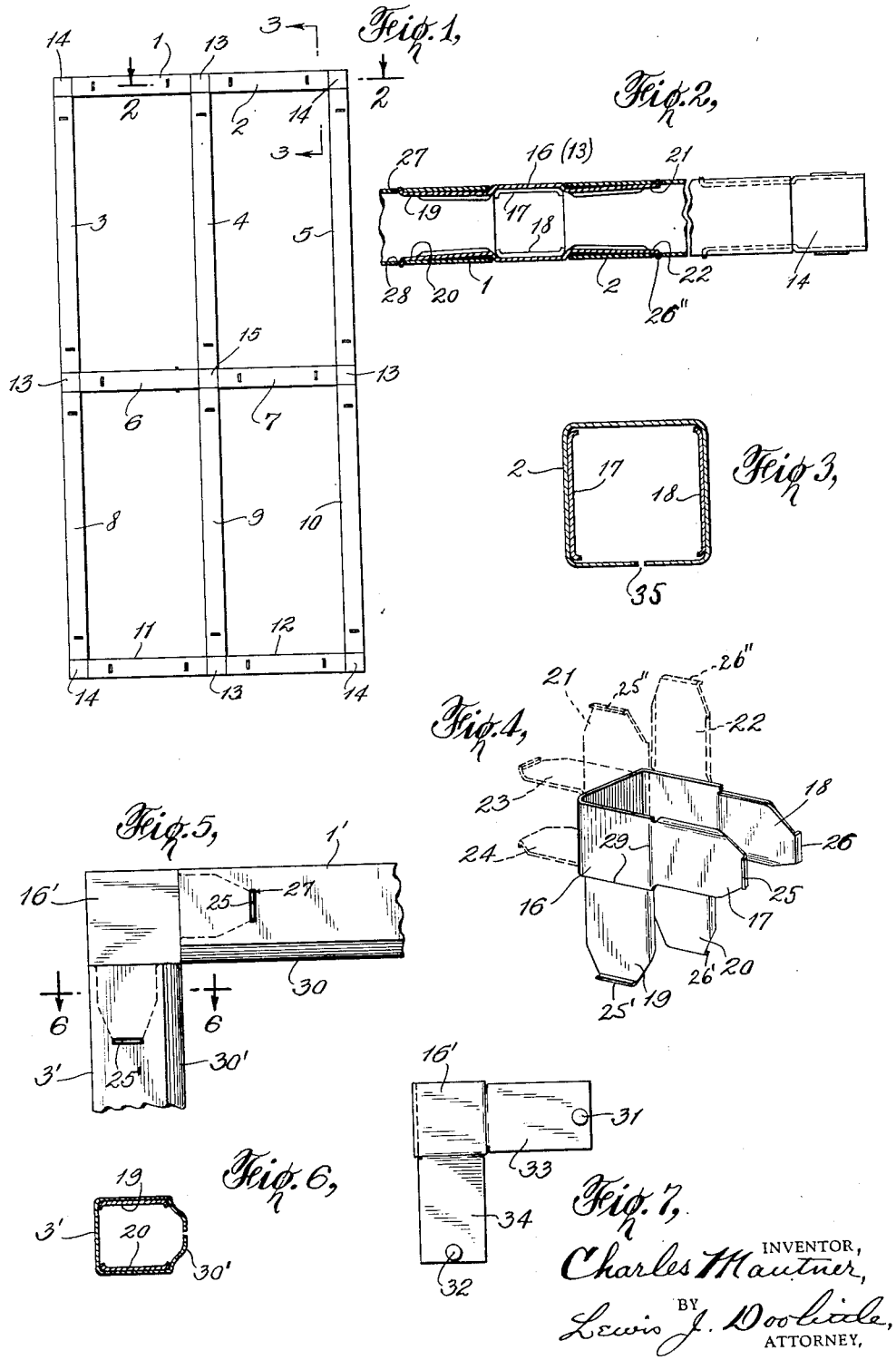

Patented Apr. 10, 1928.

1,665,816

UNITED STATES PATENT OFFICE.

CHARLES MAUTNER, OF BROOKLYN, NEW YORK.

FRAME-JOINT CONSTRUCTION.

Application filed July 19, 1927. Serial No. 206,849.

This invention relates to an improved frame joint construction adapted for use with frames of various kinds for many purposes. The object of the invention is to provide a device of simple construction, which may be cheaply manufactured and which will be effective in use to hold the several members of the frame together.

A further object of the invention is to provide a device which may be quickly applied without the use of tools or which may be as easily removed.

In carrying out the above objects of the invention I provide a member which comprises a body portion provided with resilient extensions which are adapted to be removably engaged with the frame portions which are to be held together, by simply slipping the same into or over the adjacent ends of said frame portions, thus forming a joint for holding the frame portions together. This joint may also be as easily disengaged from the frame portions, as will be described in the description of the illustrative example of such a device shown in the accompanying drawings.

In the drawings like parts in the several views have been given the same reference numeral in the various figures.

Fig. 1 is a view showing, in elevation, a frame construction with the joint applied thereto holding the frame members in position, the joint being applied at several different positions at the juncture of the frame members.

Fig. 2 is an enlarged detail view of a portion of the frame, taken on the line 2—2 of Fig. 1, looking in the direction of the arrows showing the parts in section.

Fig. 3 is another enlarged detail view, in section, of a portion of the frame, taken on the line 3—3 of Fig. 1 looking in the direction of the arrows.

Fig. 4 is a detail view, in perspective, of the frame joint removed from the frame members, indicating in dotted lines the various forms which the same may assume to adapt it for use between different parts of the frame.

Fig. 5 is a fragmentary view of one corner of a frame of somewhat different construction, having a bead around its inner edge, the joint being modified accordingly.

Fig. 6 is a detail view, in section, taken on the line 6—6 of Fig. 5.

Fig. 7 is a detail view, in elevation, of a modified form of the joint construction.

In Fig. 1, a frame is shown in conventional form to illustrate some of the applications of the joint construction for holding the parts or frame members together. The frame members are indicated by the numerals 1 to 12, inclusive, and are held together at their intersections by the joints indicated by the numerals 13, 14 and 15. The joint 13 may be termed a T joint, connecting members of the frame such as 1, 2 and 4, etc. The joint 14 may be termed an L joint, connecting members of the frame such as 1 and 3, that is, the corners of the frame. The joint 15 is formed to connect the frame members which intersect and cross at the center of the frame, such as the frame members 4, 6, 7 and 9.

One form of the frame joint construction, with modifications adapting it for use in the several positions with the frame members, is shown in Fig. 4. This joint comprises a body portion 16 provided with a pair of resilient extensions 17 and 18 extending from opposite sides of the body portion and parallel with each other, and with other similar extensions 19 and 20 extending from another side. With these two sets of extensions the joint is of the L type, indicated at 14 in Fig. 1, for connecting the corners of the frame. With the extensions 21 and 22, shown in dotted lines in Fig. 4, added to the L type of joint, it forms the T type of joint, indicated at 13 in Fig. 1, for connecting the intermediate frame members such as 7, etc. to the adjacent side members such as 5 and 10, etc. With the extensions 23 and 24, shown in dotted lines in Fig. 4, added to the T type of joint, it forms the type of joint indicated at 15 in Fig. 1, for connecting the inside members of the frame, 4, 6, 7 and 9.

A simple and cheap method of making this frame joint is to punch out from a single piece of resilient metal a blank in the form desired and bend the same into the shape indicated. This provides a single piece construction which serves the desired purpose in a very efficient manner. The ends of the extensions, for instance, 17 and 18, may be bent upwardly forming projecting portions 25 and 26, respectively, on the extensions 17 and 18.

The frame members may be formed of any desired material. A simple and cheap construction is indicated in cross section in Fig. 3, in which the frame member is formed as a square tube, of metal or other material, and providing for the insertion of glass, or whatever is to be carried by the frame, in the slit formed between the edges at 35, in Fig. 3. If the frame members are made of sheet metal formed as described, the glass, etc. will be held by the resiliency of the same in position.

Openings are provided near the ends of the frame members of a size to receive the projections, such as 25 and 26, on the extensions 17 and 18 of the joint member when the same are inserted into the frame members. The extensions being resilient, are readily pressed together to permit the same to be inserted into the ends of the frame members or to disengage the same, permitting the frame to be taken apart. Shoulders, such as 29, may also be formed in the joint between the body portion 16 and the extensions. These shoulders also serve to make a rigid joint and hold the parts together firmly when in position, the openings in the frame members being spaced so that the ends of the frame members abut the shoulders and body portion of the joint when assembled and, the frame members and body portion of the joint being of the same outside dimensions, present one continuous surface.

In the modification shown in Fig. 5 and Fig. 6, the frame members are indicated as being provided with an inner bead extending transversely thereof, shown at 30. With such a construction, it is not easy to form a good joint, especially at the corners, but with my improved joint, it is only necessary to form the joint with a body portion, 16′ in Fig. 5, sufficiently large to extend the full width of the frame and bead, or the body portion may have a corresponding bead formed at its inner corner to match the bead on the frame members. With this joint, it is only necessary to cut the frame members squarely across, which saves much time and makes a better joint than to attempt to cut the same at an angle. The joint fits the square-cut ends of the frame members and provides a continuous frame.

In the modification shown in Fig. 7, pins 31 and 32 are provided in the projections 33 and 34, respectively, which pins operate the same as the projections 26 and 25, hereinbefore described. In this case, openings in the frame members will be provided of corresponding shape and size to receive these pins.

The advantages of this construction will be obvious from the description of the same, as it is evident that the frame members may be manufactured in long strips and cut to the desired lengths by the workman. The openings are easily punched to receive the joint extension projections and, as a supply of joints is readily supplied, the assembling of the frame becomes a simple matter. Also, if it is desired to take the frame apart, to insert a glass, etc., this is also easily accomplished. It will be noted that aside from cutting the members of the frame to the desired lengths and punching the openings therein, all of which would usually be done at the factory for standard sizes of frames, no tools are required for assembling or taking apart of the frame, which is a great advantage.

As many changes could be made in the above construction and many apparently widely different embodiments of my invention designed without departing from the scope of the appended claims, I intend that all matter contained in the above description or shown in the accompanying drawings shall be interpreted as illustrative merely of an operative embodiment of my invention and not in a limiting sense.

What I claim as new and desire to secure by Letters Patent is:—

1. A frame joint comprising a body portion provided with resilient extensions arranged in pairs and each pair extending from different sides thereof, shoulders formed at the juncture of said extensions and body portion, projections formed at the ends of said extensions adapted to engage in openings in adjacent ends of said frame members, said openings being spaced to cause the ends of said frame members to abut said shoulders and to be held in position with said joint by the engagement of said projections in said openings.

2. A frame joint formed by bending into shape a blank of resilient material to form a body portion with resilient extensions arranged in pairs, the extensions of each pair being parallel to each other and extending from opposite sides of and offset from the body portion to form shoulders and also being provided with projections at their ends, which projections are positioned and adapted to engage in openings in the frame members and to hold the same in position against said shoulders and also to permit the same to be disengaged therefrom.

3. A frame and joint construction comprising a joint having a body portion interposed between and connecting the ends of the frame members when assembled, said body portion having resilient extensions arranged in pairs, the extensions of each pair being parallel to each other and extending from opposite sides of said body portion into engagement with adjacent ends of the frame members, said extensions being provided with projections and the frame members being provided with openings in opposite sides thereof in which said projections engage to hold said frame and joint members together, 4. A frame and joint construction comprising tubular frame members and a joint having a body portion interposed between and connecting the ends of the frame members when assembled, said body portion and frame members being of the same outside dimensions and presenting one continuous surface and having resilient extensions arranged in pairs, the extensions of each pair being parallel to each other and extending from opposite sides of said body portion and offset therefrom to permit said extensions being inserted into engagement with adjacent ends of the frame members, said extensions being provided with projections and the frame members being provided with openings in opposite sides thereof in which said projections engage to hold said frame and joint members together with the ends of the frame members abutting said body portion of the joint.

Signed at New York, in the county of New York and State of New York, this 7th day of July, A. D. 1927.

CHARLES MAUTNER.